United States Patent
Vilela de Faria et al.

(10) Patent No.: US 9,344,189 B2
(45) Date of Patent: May 17, 2016

(54) SYSTEM, A WAVELENGTH ISOLATOR AND METHODS THEREIN FOR SUPERVISION OF A PASSIVE OPTICAL NETWORK

(75) Inventors: Giancarlo Vilela de Faria, Rio de Janeiro (BR); Guilherme Penello Temporao, Rio de Janeiro (BR); Jean Pierre Von der Weid, Rio de Janeiro (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 14/384,612

(22) PCT Filed: Mar. 20, 2012

(86) PCT No.: PCT/SE2012/050304
§ 371 (c)(1),
(2), (4) Date: Sep. 11, 2014

(87) PCT Pub. No.: WO2013/141765
PCT Pub. Date: Sep. 26, 2013

(65) Prior Publication Data
US 2015/0023658 A1 Jan. 22, 2015

(51) Int. Cl.
H04B 10/08 (2006.01)
H04B 10/071 (2013.01)
(Continued)

(52) U.S. Cl.
CPC ......... *H04B 10/071* (2013.01); *G01M 11/3127* (2013.01); *G01M 11/3136* (2013.01); *H04B 10/272* (2013.01); *H04Q 2213/1301* (2013.01)

(58) Field of Classification Search
CPC .. H04B 10/071; H04B 10/077; H04B 10/079; H04B 10/07953
See application file for complete search history.

(56) References Cited

U.S. PATENT DOCUMENTS

| 5,943,124 A | 8/1999 | Haigh |
| 6,396,575 B1 | 5/2002 | Holland |

(Continued)

FOREIGN PATENT DOCUMENTS

| CA | 2 809 318 A1 | 3/2012 |
| JP | 2004/156962 A | 6/2004 |

(Continued)

OTHER PUBLICATIONS

ITU-T Recommendation L.53 "Optical fibre maintenance criteria for access networks", ITU-T Standardization Sector, Geneva, Switzerland, Approved by ITU-T Study Group 6 (2001-2004) under the ITU-T Recommendation A.8 procedures on May 14, 2003; 28 pages.

(Continued)

*Primary Examiner* — Dzung Tran
(74) *Attorney, Agent, or Firm* — Myers Bigel & Sibley, P.A.

(57) ABSTRACT

A system for supervision of a passive optical network includes an OTDR device, generating N+1 OTDR signals of wavelengths $\lambda_U$-$\lambda_N$, and transmitting the signals towards ONUs. The system includes a splitter having N output branches. An input of the splitter is connected to the output of the OTDR device and the output branches of the splitter are indirectly connected to the ONUs. The splitter splits the OTDR signals and forwards them towards the ONUs. The system includes a wavelength isolator having inputs connected to the splitter output branches. The wavelength isolator isolates, on individual inputs, one predetermined wavelength of the received OTDR signals per individual input, where two inputs of the wavelength isolator do not isolate the same wavelength, and forwards, from each of the inputs of the wavelength isolator, the OTDR signals to associated outputs towards the ONUs connected to the wavelength isolator by individual fiber links.

13 Claims, 8 Drawing Sheets

(51) Int. Cl.
*H04B 10/272* (2013.01)
*G01M 11/00* (2006.01)

(56) References Cited

U.S. PATENT DOCUMENTS

| | | | |
|---|---|---|---|
| 6,980,287 B2 | 12/2005 | Renard et al. | |
| 7,167,236 B2 | 1/2007 | Suino | |
| 7,310,134 B2 | 12/2007 | Kuo | |
| 7,388,657 B2 | 6/2008 | Abbott | |
| 7,620,319 B2 | 11/2009 | Krimmel | |
| 7,630,641 B1 | 12/2009 | Uhlhorn | |
| 7,715,718 B2 | 5/2010 | Smith et al. | |
| 7,756,418 B2 | 7/2010 | Ofalt et al. | |
| 7,800,744 B2 | 9/2010 | Lai et al. | |
| 7,872,738 B2 | 1/2011 | Abbott | |
| 7,894,362 B2 | 2/2011 | Effenberger | |
| 2004/0196664 A1* | 10/2004 | Renard | G01M 11/3136 362/551 |
| 2006/0164628 A1 | 7/2006 | Kuo | |
| 2009/0263123 A1 | 10/2009 | Zhu et al. | |
| 2010/0316373 A1* | 12/2010 | Chang | H04B 10/071 398/12 |
| 2011/0116799 A1* | 5/2011 | Effenberger | G01M 11/3127 398/79 |
| 2011/0141457 A1* | 6/2011 | Levin | G01M 11/3127 356/73.1 |

FOREIGN PATENT DOCUMENTS

| | | |
|---|---|---|
| WO | WO 9316533 A | 8/1993 |
| WO | WO 9723964 A | 7/1997 |

OTHER PUBLICATIONS

Yuksel et al: "Optical Layer Monitoring in Passive Optical Networks (PONs): A Review", IEEE Conference Jun. 22-26, 2008; ICTON 2008, Tu.B1.1; pp. 92-98.

Tanaka et al.: "Measuring the individual attenuation distribution of passive branched optical networks", IEEE Photonics Technol. Lett., vol. 8, No. 7, pp. 915-917, Jul. 1996.

Hilbk et al.: "Selective OTDR measurements at the central office of individual fiber links in a PON", Tech. digest Optical Fiber Communication Conf., Dallas (Texas), 1997, TuK3; 1 page.

Yamamoto et al: "In-service remote access and measurement methods for passive double star networks", 5th Conf. Sep. 7-9, 1993, Optical/Hybrid Access Networks, 1993, pp. 5.02/01-5.02/06.

Koshikiya et al.: "Simple an cost-effective fault location technique using bi-directional OTDR and in-service line testing criteria for PONs", European Conf. on Optical Commun., Glasgow, 2005.

Urban et al.: "Cost-Efficient Remote PON Monitoring Based on OTDR Measurement and OTM Functionality", ICTON 2011 Tu.C6.1.

Takasugi et al.: "A new fault-identification method using a dichroic reflective optical filter in optical subscriber loops", IEEE Journal of Lightwave Technology, vol. 11, No. 2, pp. 351-357, Feb. 1993.

Tomita et al.: "Design and performance of a novel automatic fiber line testing system with OTDR for optical subscriber loops", IEEE Journal of Lightwave Technology, vol. 12, No. 5, May 1994. Tu.B1.1 98 ICTON 2008; pp. 717-726.

Araki et al.: "Extended optical fiber line testing system using new eight-channel L/U band crossed optical waveguide coupler for L-band WDM transmission", IEEE Journal of Lightwave Technology, vol. 21, No. 12, Dec. 2003; pp. 316-3322.

Chen et al.: "Fault-locating and supervisory technique for multistaged branched optical networks", IEEE Photonics Technology Letters, vol. 6, No. 7, Jul. 1994; pp. 876-879.

Chen et al.: "A novel technique for low-cost embedded non-intrusive fiber monitoring of P2MP optical access networks", in Proc. of the Optical Fiber Communication Conf., Anaheim, 2007, OThE4.

Schmuck et al.: "Embedded OTDR techniques for cost-efficient fibre monitoring in optical access networks", European Conference on Optical Communications, ECOC 2006, IEEE; Cannes, France Sep. 24-28, 2006; 2 pages.

De Mulder et al.: "Nonintrusive fiber monitoring of TDM optical networks", IEEE J. Lightw. Technol., vol. 25, No. 1, pp. 305-317, Jan. 2007.

Gagnon et al.: "Considerations and recommendations for in-service out-of-band testing on live FTTH networks", Optical Fiber Commun. Conf., 2005, NWA3.

Nakao et al.: "Maintenance method using 1650-nm wavelength band for optical fiber cable networks", IEEE J. Lightw. Technol., vol. 19, No. 10, pp. 1513-1520, 2001.

Caviglia et al.: "Optical maintenance in PONs", European Conf. on Optical Commun., Madrid, 1998, pp. 621-626.

Yuksel et al.: "Novel Monitoring Technique for Passivel Optical Networks Based on Optical Frequency Domain Reflectometry and Fiber Bragg Gratings", J. Opt. Commun. Netw. vol. 2, No. 7, Jul. 2010.

Zou et al.: "Fault location for branched optical fiber networks based on OFDR technique using FSF laser as light source", Optical Fiber Commun. Conf., 2006, NWC2.

Rad et al.: "Experimental Validation of Periodic Codes for PON Monitoring," IEEE Globecom '09, Optical Net. Sys. Symp., Honolulu, HI, Dec. 2009, paper No. ONS-04.6.

Fouli et al.: "Optical Reflection Monitoring for Next-Generation Long-Reach Passive Optical Networks," Proc. IEEE Photonics Society Annual Meeting, Belek-Antalya, Turkey, Oct. 2009.

International Search Report for International Application No. PCT/SE2012/050304 mailed Dec. 21, 2012, 3 pages.

Written Opinion of the International Searching Authority for International Application No. PCT/SE2012/050304 mailed Dec. 21, 2012, 8 pages.

Communication with Supplementary European Search Report, Application No. EP 12871612.3, Oct. 2, 2015.

* cited by examiner

SYSTEM, A WAVELENGTH ISOLATOR AND METHODS THEREIN FOR SUPERVISION OF A PASSIVE OPTICAL NETWORK

CROSS REFERENCE TO RELATED APPLICATION

This application is a 35 U.S.C. §371 national stage application of PCT International Application No. PCT/SE2012/050304, filed on 20 Mar. 2012, the disclosure and content of which is incorporated by reference herein in its entirety. The above-referenced PCT International Application was published in the English language as International Publication No. WO 2013/141765 A1 on 26 Sep. 2013.

TECHNICAL FIELD

The present disclosure relates to Passive Optical Networks and in particular to supervision of Passive Optical Networks.

BACKGROUND

The growth of the demand for data from the Internet and other networks increases the demand for higher speeds in transmission and delivery systems, especially at the last mile. Nowadays the only feasible and cost-effective way to comply with actual requirements is using optical networks. Thus, some topologies based on Passive Optical Networks, PONS are being used as a solution. Thereat, the deployment of the networks called of Fibre To The "x" (FTTx, where x could be home, building, curb, etc) is an ordinary reality increasing the reach of these PONS. However, with the increasing number of spread fibres and cables, the probability of fault at some point of the PON also increases.

In order to ensure the operation within the acceptable requirements demanded by the current standards organizations and governments, the supervision or monitoring of these deployed networks should be done with more demanding requirements than traditional supervision or monitoring systems, in spite of the lack of standardized methods or tools, except for some general recommendations in ITU-T L-series. On the other hand, the capital and operational expenses with their infrastructure should be adequate to equalize investment and profit. Thus, the operators need to provide solutions to monitor their FTTx networks such that they are relatively inexpensive.

Basically, the technical requirements are higher resolution than traditional monitoring systems based in Optical Time Domain Reflectometry, OTDR, in order to localise faults with reasonable accuracy, and enough dynamic range to monitor split ratios up to 1:128 that could be used in the remote nodes and differential distances up to 60 Km.

In order to meet the technical requirements, some examples have been presented as a possible solution, but most of them are very far from feasible, either due to the high cost or the complex management of the markers or fibre lengths in order to identify each optical network unit (ONU) or terminal (ONT).

The main purpose of a fault monitoring system is the detection and location of failures in PON network fibre links, and many techniques have already been developed and implemented with this purpose. The main challenge of the failure monitoring system is the compromise between long range and high precision, which requires a high dynamic range.

OTDR-based systems with auxiliary data processing are widely employed. However, small losses can be neglected, unless a very large number of measurements is performed in order to obtain an average signal with a very low noise level, which requires a long sampling time. There is also a great challenge to identify in which branch, or network branch, the failure is situated. By a branch is meant the fibre link connecting a splitter, or Remote Node, RN, with an ONU or an ONT.

In order to try to identify in which of the network branches the fault is occurring and to determine its precise location, some techniques use reflectors with distinct reflection coefficients (mostly low reflection coefficients) installed at many points along the link. However, there are some disadvantages associated with such a solution for example low precision, high cost and complexity with respect to the installation of the reflectors along many points of the PON.

One solution is a set up with T-OTDR (tunable OTDR) and a Wavelength Division Multiplexer, WDM, as a by-pass to forward the T-OTDR signal to the branch to be monitored. However this technique requires the WDM to be installed within the RN. It adds extra costs and increases the power loss to the OTDR signal and to a data signal as well. Another disadvantage of this technique is the inability to monitor and detect any fault into the by-pass system (WDM, Arrayed Waveguide Grating, AWG, etc.). In case of a fault occurring inside the by-pass on the data connection, the OTDR signal will be by-passed showing a regular trace in the OTDR trace but the data signal will be interrupted.

Brillouin-based OTDR is another example of a solution for the identification and location of faults in fibre branches of the same length as the Brillouin frequencies are unique for all fibres. However, this system is rather complex and expensive, as special fibres must be installed and this system has not yet been shown to be able to monitor standard splitting ratios greater than 64.

Photon-counting OTDR features high dynamic range is still another example, but it shares the problems of standard OTDR concerning complex data processing and fault location in arms of the same length, which are problems yet to be solved. Techniques based on optical coding (OCDMA-inspired) are cost-attractive solutions, yet many aspects must be improved, such as data processing, power budget constraints and generalization to all PON topologies.

SUMMARY

The object is to obviate at least some of the problems outlined above. In particular, it is an object to provide a system and a wavelength isolator, and respective methods therein, for supervision of PON, wherein the PON has a number of N ONUs connected to a splitter or the wavelength isolator. These objects and others may be obtained by providing a system, a wavelength isolator and a method in a system, and in a wavelength isolator according to the independent claims attached below.

According to an aspect a system for supervision of a PON is provided. The system comprises an Optical Time Domain Reflectometer, OTDR device, adapted to generate N+1 OTDR signals of wavelengths $\lambda_0, \lambda_1, \ldots, \lambda_N$, respectively, and to inject the OTDR signals in a fibre link towards Optical Network Users, ONUs. The system further comprises a splitter having N output branches, wherein an input of the splitter is connected to the output of the OTDR device and the output branches of the splitter are indirectly connected to the ONUs, wherein the splitter is arranged to split the received OTDR signals and to forward them towards the ONUs. The system comprises a wavelength isolator having inputs connected to the splitter output branches, the wavelength isolator being configured to isolate, on individual inputs, one predetermined wavelength of the received OTDR signals per individual input, wherein two inputs of the wavelength isolator do not isolate the same wavelength, and to forward, from each of the inputs of the wavelength isolator, the received OTDR signals except the respective isolated wavelength to associated outputs of the wavelength isolator towards the ONUs, which are connected to the wavelength isolator by individual fibre links. In this manner, one predetermined wavelength of the OTDR signal is filtered out per fibre link.

According to an aspect, a wavelength isolator is provided. The wavelength isolator has inputs connectable to splitter output branches of a splitter. The wavelength isolator is configured to receive OTDR signals on the inputs and to isolate one predetermined wavelength of a received optical signal per individual input, wherein two inputs of the wavelength isolator do not isolate the same wavelength. The wavelength isolator further is adapted to forward, from each of the inputs of the wavelength isolator, a received OTDR signal of any wavelengths except the respective isolated wavelength for each respective input to associated individual outputs of the wavelength isolator and to output from the individual outputs, the forwarded respective OTDR signals.

According to an aspect, a method in a system for supervision of a PON is provided. The method comprises generating, in an OTDR device, N+1 OTDR signals of wavelengths $\lambda_0$, $\lambda_1, \ldots, \lambda_N$, respectively, and injecting the OTDR signals in fibre links to a splitter towards Optical Network Users, ONUs. The method further comprises receiving and splitting, in the splitter having N output branches, the OTDR signals, wherein the OTDR signals are received on an input of the splitter and are outputted on output branches to a wavelength isolator towards the ONUs. FIG. 4 further illustrates the method comprising receiving the OTDR signals in the wavelength isolator and isolating, in the wavelength isolator having inputs connected to the splitter output branches, on individual inputs, one predetermined wavelength of the received OTDR signals per individual input, wherein two inputs of the apparatus do not isolate the same wavelength. The method comprises forwarding, from each of the inputs of the wavelength isolator, the respective received OTDR signals except the respective isolated wavelength to associated outputs of the wavelength isolator towards the ONUs, which are connected to the wavelength isolator by means of individual fibre links. In this manner, one predetermined wavelength of the N+1 OTDR signal per individual fibre link to individual ONUs is filtered out.

According to an aspect, a method in a wavelength isolator connectable to splitter output branches of a splitter, for isolating, on individual inputs, one predetermined wavelength of received OTDR signals, from an OTDR device, per individual input, wherein two inputs of the wavelength isolator do not isolate the same wavelength is provided. The method comprises receiving the OTDR signals on inputs of the wavelength isolator. The method also comprises isolating, on each individual input, one predetermined wavelength of the received OTDR signals, which isolated wavelength is specific for one specific input. Further, the method comprises forwarding, from each of the inputs of the wavelength isolator, the received OTDR signal of any wavelengths except the respective isolated wavelength for each respective input to associated outputs of the wavelength isolator. FIG. 5 illustrates the method further comprising outputting the forwarded signal from the individual outputs of the wavelength isolator to individual fibre links connected to said individual outputs.

The system for supervision of the PON and the method therein have several advantages. Due to the set of OTDR traces, greater precision in the location and loss estimation may be obtained. Identification, location and differentiation of faults located at the same distance from the splitter but in different branches are enabled. Identification and location of faults also immediately after the splitter or wavelength isolator are enabled. Further, the use of isolating arrangements only at the splitter without any need for updating or installing equipment at the ONUs facilitates installation and reduces cost of installation, operation and maintenance. Still further, no external elements to the CO are needed. In case the splitter and wavelength isolator are comprised in a RN, then no external elements to the RN are needed. A further advantage is that no additional active components are needed. Further, reflectors are relatively inexpensive, thus this supervision or monitoring of the PON is a cost effective solution. The data processing of the obtained OTDR traces does not require great computational power. Yet an advantage is that a single OTDR device in a CO may be shared by different network, hence further reducing cost for supervision and monitoring of the PON. The OTDR signals do not need to bypass any network component and also faults inside the splitter or RN may be detected. Further, this solution is scalable, meaning that it may be used in different network topologies. It shall be pointed out that a reflector in this context in one example isolates a signal of a predetermined wavelength and in another example reflects the whole signal. In the example of the reflector reflecting the whole OTDR signal, this back-reflected signal should be subtracted from the trace resulting from this OTDR signal. Still an advantage is that the wavelength isolator is transparent to the upstream and downstream data signals.

The wavelength isolator and the method therein for isolating, on individual inputs, one predetermined wavelength of received OTDR signals, from an OTDR device, per individual input, wherein two inputs of the wavelength isolator do not isolate the same wavelength have several advantages. In case the splitter and wavelength isolator are comprised in a RN, then no external elements to the RN are needed. A further advantage is that no additional active components are needed. Further, isolating arrangements in the form of reflectors are relatively inexpensive, thus this supervision or monitoring of the PON is a cost effective solution. When used in a system as described above, all the above advantages can be achieved. It shall be pointed out that a reflector in this context in one example isolates a signal of a predetermined wavelength and in another example reflects the whole signal. In the example of the reflector reflecting the whole OTDR signal, this back-reflected signal should be subtracted from the trace resulting from this OTDR signal. Still an advantage is that the wavelength isolator is transparent to the upstream and downstream data signals.

BRIEF DESCRIPTION OF DRAWINGS

Embodiments will now be described in more detail in relation to the accompanying drawings, in which.

DETAILED DESCRIPTION

Briefly described, exemplifying embodiments of a system for supervision of a PON and a method in such a system for supervision of the PON is provided. Further, a wavelength isolator and a method therein are provided for isolating, on individual inputs, one predetermined wavelength of received OTDR signals, from an OTDR device, per individual input, wherein two inputs of the wavelength isolator do not isolate the same wavelength. The OTDR signals have different wavelengths than the data signals. The data signals are thereby not affected by the isolator. The data signals have in one example a wavelength being within a wavelength band and the OTDR signals are in a different wavelength band, wherein the two different wavelength bands do not overlap. The wavelength isolator is transparent to the upstream and downstream data signals.

Figure 1:
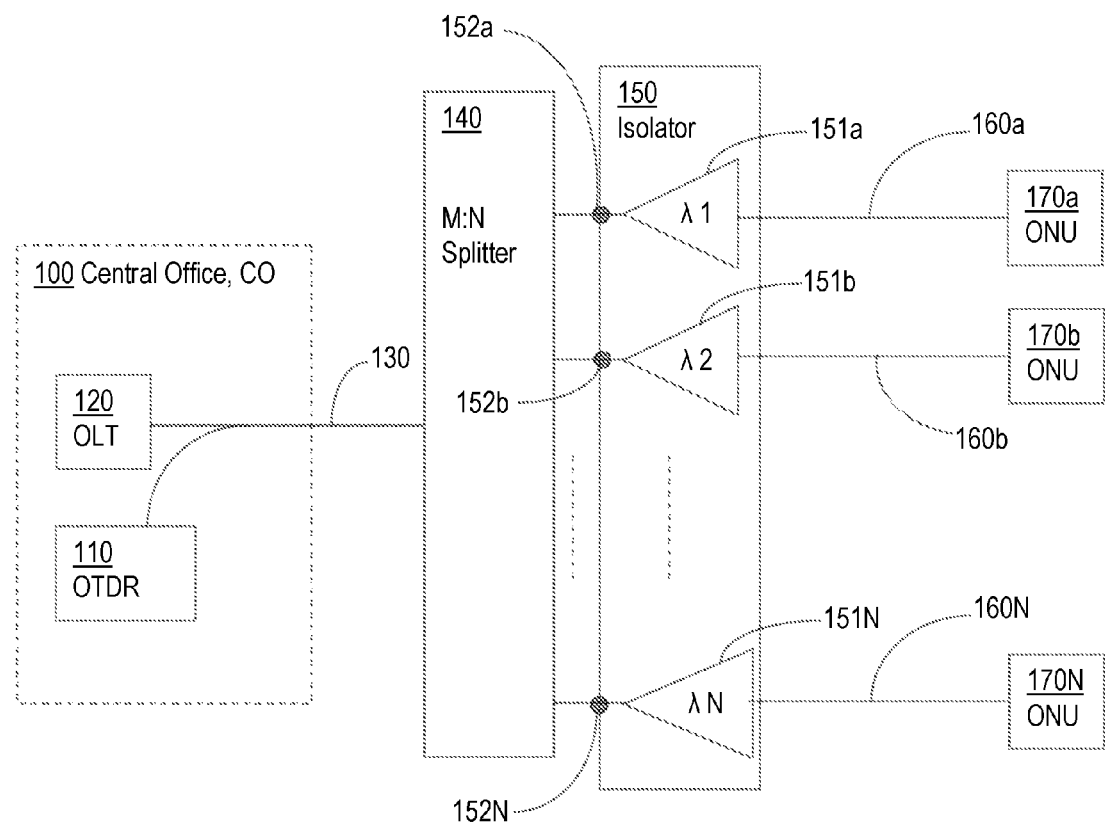
FIG. 1 is an exemplifying architectural overview of a system for supervision of a PON.

An exemplifying embodiment of such a system for supervision of a PON will now be described with reference to FIG. 1. FIG. 1 is an exemplifying architectural overview of a system for supervision of a PON. The system comprises an Optical Time Domain Reflectometer, OTDR device 110, adapted to generate N+1 OTDR signals of wavelengths $\lambda_0$, $\lambda_1$, ..., $\lambda_N$, respectively, and to inject the OTDR signals in a fibre link 130 towards Optical Network Users, ONUs 170a-170N. The system further comprises a splitter 140 having N output branches, wherein an input of the splitter is connected to the output of the OTDR device 110 and the output branches of the splitter 140 are indirectly connected to the ONUs 170a-170N, wherein the splitter 140 is arranged to split the received OTDR signals and to forward them towards the ONUs 170a-170N. FIG. 1 also illustrates the system comprising a wavelength isolator 150 having inputs connected to the splitter output branches, the wavelength isolator 150 being configured to isolate, on individual inputs, one predetermined wavelength of the received OTDR signals per individual input, wherein two inputs of the wavelength isolator 150 do not isolate the same wavelength, and to forward, from each of the inputs of the wavelength isolator, the received OTDR signals except the respective isolated wavelength to associated outputs of the wavelength isolator towards the ONUs 170a-170N, which are connected to the wavelength isolator 150 by individual fibre links 160a-160N. In this manner, one predetermined wavelength of the OTDR signal is filtered out per fibre link 160a, 160b, ..., 160N.

Generally, in a PON, a Central Office, CO, is connected to a splitter. The CO 100 is connected to the splitter 140 via a fibre link which is generally referred to as a feeder fibre link. The CO 100 comprises an Optical Line Terminal, OLT, 120 which transmits data signals towards ONUs 170a-170N. When the OLT transmits a data signal towards one of the ONUs 170a-170N, the OLT 120 generates the data signal and injects the data signal into the feeder fibre link to the splitter 140.

The system for supervision of the PON comprises an OTDR device 110. Generally in a PON, an OTDR device is comprised in the CO. The OTDR device 110 is in the system is located in the CO 100 and the OTDR device 110 is adapted to generate OTDR signals of different wavelengths, wherein one OTDR signal has one specific wavelength. The OTDR device 110 is adapted to generate one more wavelength, i.e. OTDR signal, than there are ONUs, which are connected to the CO 100, connected indirectly via the splitter 140. The OTDR device 110 injects the generated OTDR signals into a fibre link 130 towards the ONUs 170a-170N. In FIG. 1, which is merely a schematic illustration, both the OLT 120 and the OTDR device 110 inject their respective signals, i.e. the data signals and the OTDR signals respectively, in the same fibre link 130. By "towards" the ONUs 170a-170N is meant "in the direction of". As can be seen in FIG. 1, the OTDR device is connected to the splitter 140 so the generated OTDR signals are sent to the splitter towards the ONUs.

It shall be pointed out that the OTDR device 110 in one example is connected to the splitter 140 via an individual fibre link (not shown in FIG. 1) wherein the splitter 140 will receive the data signals on the feeder fibre link and the OTDR signals on the individual fibre link. Alternatively, the OTDR device 110 is arranged to inject the OTDR signals in the same fibre link, i.e. the feeder fibre link, which the OLT 120 uses to inject data signals to the splitter 140. In this latter example, which is the one illustrated in FIG. 1, an additional filter (not shown) is employed in the CO 100 which additional filter multiplexes the data signals and the OTDR signals together and then outputs the multiplexed signals on the feeder fibre link to the splitter 140.

The splitter 140 receives both the data signals from the OLT 120 and the OTDR signals from the OTDR device 110. In the system for supervision of the PON, only the OTDR signals are of interest since they are the ones that are used to supervise or monitor the PON. Consequently, only the OTDR signals will be described in detail here. Each OTDR signal which is received from the OTDR device 110 at the splitter 140 has a specific wavelength: $\lambda_0, \lambda_1, \ldots, \lambda_N$. The splitter will output the received OTDR signal irrespective of the wavelength to all its N outputs. Note that there are N outputs (1, 2, ..., N) and N+1 wavelengths (0, 1, 2, ..., N). It shall also be pointed out that the wavelengths of the individual OTDR signals are different from the wavelengths of data signals transmitted from the OLT 120.

The N outputs of the splitter 140 are connected to respective N inputs of the wavelength isolator 150. The wavelength isolator 150 also has N outputs, i.e. as many outputs as inputs, wherein one input is associated with one corresponding output. The wavelength isolator is configured to isolate, on individual inputs, one predetermined wavelength of the received OTDR signals per individual input. This is illustrated in FIG. 1 by the isolating arrangements 151a-151N. Looking at FIG. 1, input 1 152a of the wavelength isolator 150 will isolate wavelength $\lambda_1$, input 2 152b of the wavelength isolator 150 will isolate wavelength $\lambda_2$ and input N 152N of the wavelength isolator 150 will isolate wavelength $\lambda_N$. Two inputs of the wavelength isolator 150 do not isolate the same wavelength. Further wavelength $\lambda_0$ will not be isolated by any of the individual isolating arrangements 151a-151N, meaning that an OTDR signal having wavelength $\lambda_0$ will be forwarded to all ONUs 170a-170N connected to the wavelength isolator 150.

The wavelength isolator 150 is configured to forward, from each of the inputs of the wavelength isolator, the received OTDR signals except the respective isolated wavelength to associated outputs of the wavelength isolator towards the ONUs 170a-170N, which are connected to the wavelength isolator 150 by individual fibre links 160a-160N. In this manner, one predetermined wavelength of the OTDR signal is filtered out per fibre link 160a, 160b, ..., 160N. The fibre links 160a-160N are referred to as branches or drop links.

Thereby, a set of OTDR traces may be obtained. An OTDR trace is the result, in the form of backscattered light power, from injecting and OTDR signal from the OTDR device 110 towards the ONUs 170a-170N. When the OTDR signal travels from the OTDR device towards the ONUs 170a-170N, portions of the OTDR signal will back scatter towards the OTDR device due to Rayleigh scattering. The backscattered light power is then analysed and possible faults on a fibre between the splitter 140 and the ONUs 170a-170N may then be detected and its location and severity may be determined.

It shall be noted that the splitter 140 of FIG. 1 has N outputs and up to N inputs, i.e. only one input of the splitter 140 may be used thereby making the splitter having the function of a 1:N splitter.

The splitter 140 is in one example comprised in a Remote Node, RN, wherein the splitter and the wavelength isolator 150 are connected together in the RN. In one example, the splitter and the wavelength isolator are integrated together within the RN.

The system has several advantages. Due to the set of OTDR traces, greater precision in the location and loss estimation may be obtained. Identification, location and differentiation of faults located at the same distance from the splitter but in different branches are enabled. Identification and location of faults also immediately after the splitter or wavelength isolator are enabled. Further, the use of isolating arrangements only at the splitter without any need for updating or installing equipment at the ONUs facilitates installation and reduces cost of installation, operation and maintenance. Still further, no external elements to the CO are needed. In case the splitter and wavelength isolator are comprised in a RN, then no external elements to the RN are needed. A further advantage is that no additional active components are needed. Further, reflectors are relatively inexpensive, thus this supervision or monitoring of the PON is a cost effective solution. The data processing of the obtained OTDR traces does not require great computational power. Yet an advantage is that a single OTDR device in a CO may be shared by different network, hence further reducing cost for supervision and monitoring of the PON. The OTDR signals do not need to bypass any network component and also faults inside the splitter or RN may be detected. Further, this solution is scalable, meaning that it may be used in different network topologies. It shall be pointed out that a reflector in this context in one example isolates a signal of a predetermined wavelength and in another example reflects the whole signal. In the example of the reflector reflecting the whole OTDR signal, this back-reflected signal should be subtracted from the trace resulting from this OTDR signal. Still an advantage is that the wavelength isolator is transparent to the upstream and downstream data signals.

In an example, wherein the wavelength isolator 150 is adapted to receive backscattered light from the fibre links 160a-160N and to forward the received backscattered light to the splitter 140 towards the OTDR device 110.

In order to detect and analyse a possible fault that has occurred along any of the fibre links 160a-160N, backscattered light resulting from the OTDR signal travelling from the splitter 140 and the wavelength isolator 150 towards the ONUs 170a-170N should be forwarded back towards the OTDR device 110. This means that backscattered light occurring in the fibre links 160a-160N travels in the opposite direction as the generated OTDR signals being sent or transmitted towards the ONUs 170a-170N. The backscattered light travels towards the OTDR device 110 and the backscattered light first reaches the wavelength isolator 150. The wavelength isolator 150 is configured to forward the backscattered light to the splitter 140, which in turn is configured to forward the backscattered light towards the OTDR device 110.

According to an example, the number of generated OTDR signals of individual wavelengths is at least one more than the number of ONUs 170a-170N which are connected to the splitter by the individual fibre links 160a-160N.

The wavelength isolator 150 is configured to isolate, on individual inputs, one predetermined wavelength of the received OTDR signals per individual input. This is illustrated in FIG. 1 by the isolating arrangements 151a-151N. The number of generated OTDR signals of individual wavelength is N+1, since there is a number N of ONUs 170a-170N and the OTDR device 110 is configured to generate one more OTDR signals of individual wavelength than there are number of ONUs connected to the splitter. This means that out of N+1 wavelengths, there is one single wavelength which will not be isolated in the wavelength isolator 150, so that an OTDR signal having this wavelength will be forwarded to each and every one of the ONUs 170a-170N that are connected to the splitter 140 and the wavelength isolator 150. Using the terminology above, the one wavelength that will not be isolated in the wavelength isolator 150 is $\lambda_0$. Consequently, an OTDR signal having wavelength $\lambda_0$ will be forwarded to each and every one of the ONUs 170a-170N.

Embodiments herein also relate to a wavelength isolator. Such a wavelength isolator will now be described with reference to FIG. 2 which is a block diagram of an exemplifying embodiment of such a wavelength isolator.

Figure 2:
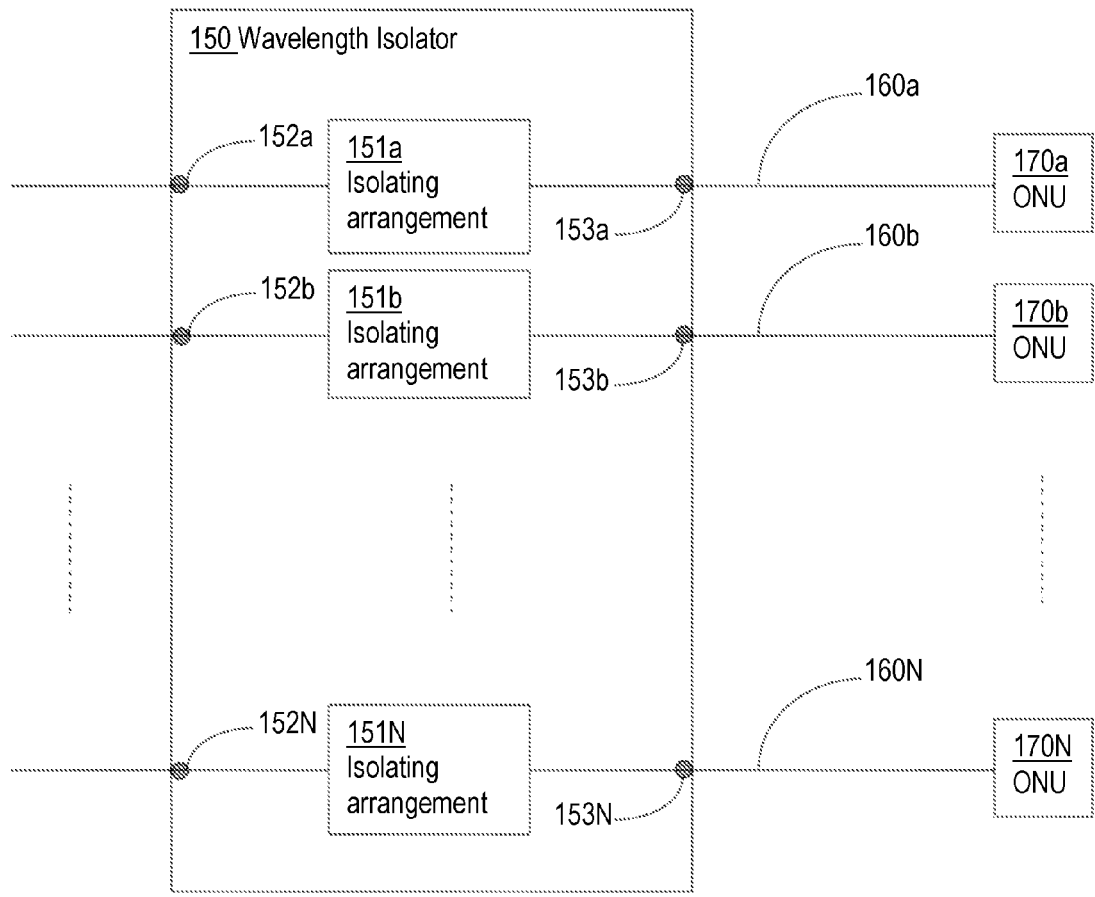
FIG. 2 is a block diagram of an exemplifying embodiment of a wavelength isolator.

FIG. 2 illustrates the wavelength isolator 150 having inputs 152a-152N connectable to splitter output branches of a splitter (not shown). The wavelength isolator 150 is configured to receive OTDR signals on the inputs 152a-152N and to isolate one predetermined wavelength of a received optical signal per individual input 152a-152N, wherein two inputs of the wavelength isolator 150 do not isolate the same wavelength. The wavelength isolator 150 further is adapted to forward, from each of the inputs of the wavelength isolator, a received OTDR signal of any wavelengths except the respective isolated wavelength for each respective input to associated individual outputs of the wavelength isolator and to output from the individual outputs 153a-153N, the forwarded respective OTDR signals.

The wavelength isolator 150 illustrated in FIG. 2 has N individual inputs 152a-152N. The wavelength isolator 150 further has N individual isolating arrangements 151a-151N and N individual outputs 153a-153N. Each individual input is connected to a respective isolating arrangement which in turn is connected to a respective output. OTDR signals received on the inputs 152a-152N will be forwarded to the respective isolating arrangements 151a-151N. In the isolating arrangements 151a-151N, one predetermined wavelength of a received optical signal is isolated, i.e. blocked from passing through the isolating arrangement, per individual input 152a-152N, wherein two inputs of the wavelength isolator 150 do not isolate the same wavelength. In other words, an OTDR signal received on input 152a will be forwarded to isolating arrangement 151 a. In isolating arrangement 151a, any wavelength will pass through the isolating arrangement 151 except wavelength $\lambda_1$. This means that an OTDR signal having wavelength $\lambda_1$ will be isolated in the isolating arrangement 151a such that that particular OTDR signal will not be forwarded to the output 153a and hence will not be outputted into fibre link 160a towards ONU 170a. An OTDR signal received on input 152b having wavelength $\lambda_2$ will be isolated in isolating arrangement 151b and not forwarded to output 153b. An OTDR signal received on input 152N having wavelength $\lambda_N$ will be isolated in isolating arrangement 151N and not forwarded to output 153N. $\lambda_1 \neq \lambda_2 \neq \lambda_3 \neq \ldots \neq \lambda_N \neq \lambda_0$, wherein an OTDR signal having wavelength $\lambda_0$ is not isolated, i.e. blocked, in any of the isolating arrangements 151a-151N.

The wavelength isolator has several advantages. In case the splitter and wavelength isolator are comprised in a RN, then no external elements to the RN are needed. A further advantage is that no additional active components are needed. Further, isolating arrangements in the form of reflectors are relatively inexpensive, thus this supervision or monitoring of the PON is a cost effective solution. When used in a system as described above, all the above advantages can be achieved. It shall be pointed out that a reflector in this context in one example isolates a signal of a predetermined wavelength and in another example reflects the whole signal. In the example of the reflector reflecting the whole OTDR signal, this back-reflected signal should be subtracted from the trace resulting from this OTDR signal. Still an advantage is that the wavelength isolator is transparent to the upstream and downstream data signals.

According to an embodiment, wherein when the wavelength isolator is employed in a Passive Optical Network, PON, the inputs 152a-152N of the wavelength isolator 150 are connected to output branches of a splitter and the outputs 153a-153N of the wavelength isolator 150 are connected to fibre links 160a-160N towards Optical Network Users, ONUs 170a-170N.

The splitter is not illustrated in FIG. 2, but looking at FIG. 1, the wavelength isolator 150 is illustrated when in use in a PON, wherein the wavelength isolator 150 is connected to the splitter 140.

According to still an embodiment, each individual input 152a, 152b, . . . , 152N of the wavelength isolator 150 is associated with one individual output 153a, 153b, . . . , 153N of the wavelength isolator.

Figure 3:
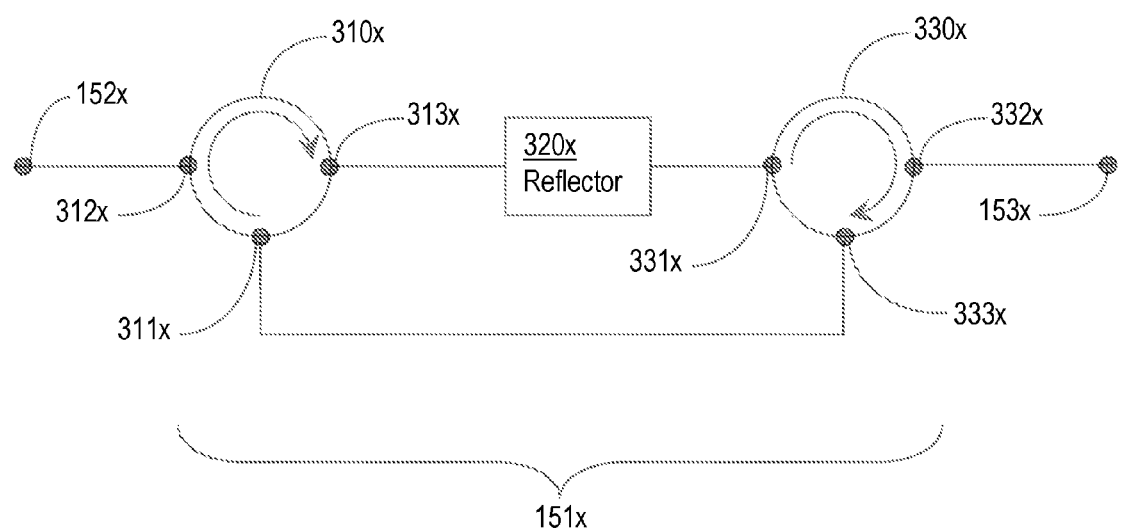
FIG. 3 is a block diagram of an exemplifying isolating arrangement at an input of a wavelength isolator for isolating one predetermined wavelength.

FIG. 3 is a block diagram of an exemplifying isolating arrangement at an input of a wavelength isolator for isolating one predetermined wavelength. In FIG. 3, one isolating arrangement is illustrated, namely isolating arrangement 151x, wherein x=a, b, . . . , N. Looking at FIG. 3, in an example, each individual input 152a-152N of the wavelength isolator is connected to port 312a-312N of a respective first circulator 310a-310N having three ports 311a-311N, 312a-312N, 313a-313N. Port 311a-311N is referred to as the first port, 312a-312N is referred to as the second port and 313a-313N is referred to as the third port. Thereby, each individual input 152a-152N of the wavelength isolator is connected to the second port 312a-312N of the respective first circulator 310a-310N. The third port 313a-313N of the first circulator 310a-310N is connected to a reflector 320a-320N reflecting one predetermined wavelength specific for each individual input 152a-152N. The reflected signal from the reflector 320a-320N will be blocked at the third port 313a-313N of the respective first circulator 310a-310N. The reflector 320a-320N further is connected to a port 331a-331N of a second circulator 330a-330N having three ports 331a-331N, 332a-332N, 333a-333N. The ports are referred to the first, second and third port as for the first circulator. The second port 332a-332N of the second circulator 330a-330N is connected to one individual output 153a-153N of the wavelength isolator associated with a respective individual input 152a-152N, wherein the third port 333a-333N of the second circulator 330a-330N is connected to first port 311a-311N of the first circulator 310a-310N.

FIG. 3 is a block diagram of an exemplifying isolating arrangement at an input of a wavelength isolator for isolating one predetermined wavelength. FIG. 3 illustrates isolating arrangement 151x. As described above, there are N number of different isolating arrangements, each individual isolating arrangement isolating one individual and predetermined wavelength.

FIG. 3 illustrates the isolating arrangement 151x being connected to an input 152x of the wavelength isolator 150. The isolating arrangement 151x comprises two circulators, 310x and 330x. The circulator is, in this context, a three terminal device that will allow a signal to flow between any two adjacent ports. This flow is restricted to one direction only. Circulators may have more ports than three, but in this solution, a three-port-circulator is employed. Looking at FIG. 3, the first circulator 310x has a first port 311x, a second port 312x and a third port 313x. Any signal entering the circulator 310x on the first port 311x, will flow to the second port 312x and be outputted from the second port 312x. Any signal entering the circulator 310x on the second port 312x, will flow to the third port 313x and be outputted from the third port 313x. Any signal arriving to the circulator 310x at the third port 313x, will not flow to the first port 311x, since the third port of the circulator do not forward the signal to the first port. Thereby, any signal arriving at the third port of the circulator will simply be blocked. The second circulator has the same function.

An OTDR signal travelling or flowing to input port 152x of the wavelength isolator 150 (see FIG. 1) will flow through the first circulator 310x from the second port 312x to the third port 313x. At the third port, the OTDR signal will be outputted from the first circulator 310x to the reflector 320x. The reflector 320x will allow all OTDR signals flow through it except for an OTDR signal having wavelength $\lambda_x$. If an OTDR signal having wavelength $\lambda_x$ reaches the reflector 320x, the OTDR signal will be reflected by reflector 320x and isolated in the third port 313x of the first circulator 310x. If an OTDR signal having any other wavelength reaches the reflector 320x, the OTDR signal will flow or travel through the reflector 320x and to the second circulator 330x. The OTDR signal will enter the second circulator 330x by the first port 331x and will flow through the second circulator 330x to the second port 332x, where the OTDR signal will be outputted towards an output 153x of the wavelength isolator 150. From the wavelength isolator 150, the OTDR signal will then travel in a fibre link towards an ONU. Comparing FIGS. 3 and 1, the fibre link would be fibre link 160x and the ONU would be ONU 170x. As the OTDR signals travels in fibre link 160x towards ONU 170x, portions of the OTDR signal will be backscattered towards the OTDR device 110 as described above. This backscattered signal will enter the wavelength isolator 150 on the output port 153x. In this instance, the output port has the function of an input port. The backscattered OTDR signal will then enter the second circulator 330x by the second port 332x and flow through the second circulator 330 to the third port 333x, where the backscattered signal will be outputted and travel towards the first port 311x of the first circulator 310x. The backscattered signal enters the first circulator 310x by the first port 311x, flows through the first circulator 310x to the second port 312x, where the signal will be outputted from the first circulator 310x and forwarded to the input port 152x of the wavelength isolator 150. In this instance, the input port 152x has the function of an output port. The backscattered signal will be outputted from the wavelength isolator 150 towards the splitter 140, see FIG. 1, so that the backscattered signal travels to the OTDR device 110.

When the backscattered signal reaches the OTDR device, the backscattered signal will constitute or be part of a trace. The trace may then be analysed at the OTDR device, or outputted from the OTDR device to a control unit which is configured to analyse the trace in order to detect a possible fault occurring on any fibre link 160a-160N connecting the ONUs 170a-170N to the splitter 140 and the wavelength isolator 150.

One reason for not letting the backscattered signal travel or flow through the reflector 320x is that the backscattered signal would be somewhat attenuated by the reflector 320x making the trace weaker as it reaches the central office or OTDR device. A weaker trace contains more noise and is more difficult to analyse.

According to an example, the reflector 320a-320N is a Bragg reflector.

Embodiments herein also relate to a method in a system for supervision of a PON. Such a method will now be described with reference to FIGS. 4a and 4b, which are flowcharts of an exemplifying embodiment of such a method in a system for supervision of the PON.

The method has the same objects, advantages and technical features as the system described above. The method will only be described in brief in order to avoid unnecessary repetition.

Figure 4A:
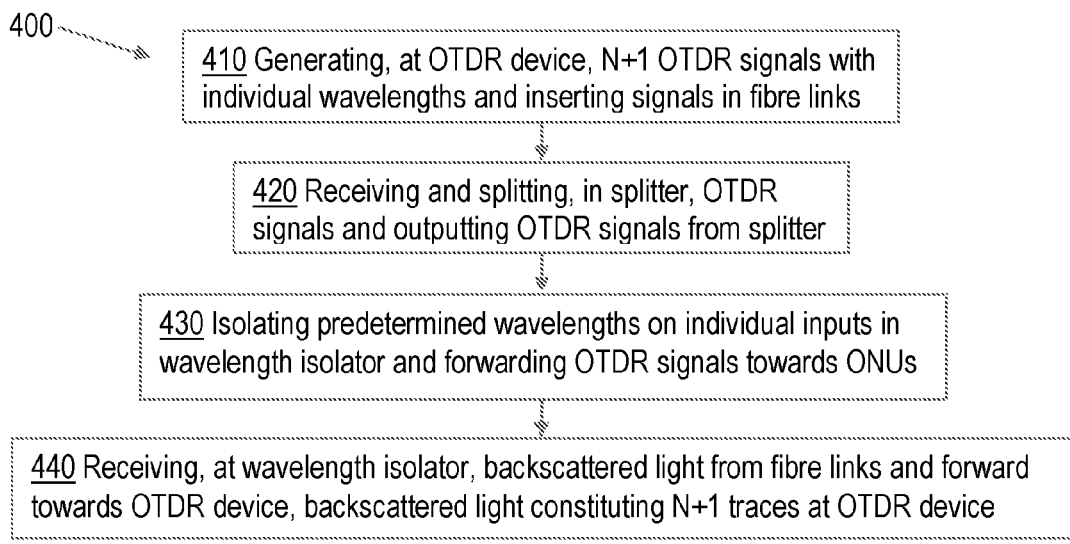
FIGS. 4a and 4b are flowcharts exemplifying embodiments of a method in a system for supervision of a PON.

FIG. 4a illustrates the method comprising generating 410, in an OTDR device, N+1 OTDR signals of wavelengths $\lambda_0$, $\lambda_1, \ldots, \lambda_N$, respectively, and injecting the OTDR signals in fibre links to a splitter towards Optical Network Users, ONUs. The method further comprises receiving and splitting 420, in the splitter having N output branches, the OTDR signals, wherein the OTDR signals are received on an input of the splitter and are outputted on output branches to a wavelength isolator towards the ONUs. FIG. 4 further illustrates the method comprising receiving the OTDR signals in the wavelength isolator and isolating 430, in the wavelength isolator having inputs connected to the splitter output branches, on individual inputs, one predetermined wavelength of the received OTDR signals per individual input, wherein two inputs of the apparatus do not isolate the same wavelength. The method comprises forwarding, from each of the inputs of the wavelength isolator, the respective received OTDR signals except the respective isolated wavelength to associated outputs of the wavelength isolator towards the ONUs, which are connected to the wavelength isolator by means of individual fibre links. In this manner, one OTDR signal of a predetermined wavelength is filtered out per ONU, or per individual fibre link connecting an individual ONU to the splitter or wavelength isolator, and at least one OTDR signal wavelength is fully transmitted to all ONU on all individual fibre links.

The method has several advantages. Due to the set of OTDR traces, greater precision in the location and loss estimation may be obtained. Identification, location and differentiation of faults located at the same distance from the splitter but in different branches are enabled. Identification and location of faults also immediately after the splitter or wavelength isolator are enabled. Further, the use of isolating arrangements only at the splitter without any need for updating or installing equipment at the ONUs facilitates installation and reduces cost of installation, operation and maintenance. Still further, no external elements to the CO are needed. In case the splitter and wavelength isolator are comprised in a RN, then no external elements to the RN are needed. A further advantage is that no additional active components are needed. Further, reflectors are relatively inexpensive, thus this supervision or monitoring of the PON is a cost effective solution. The data processing of the obtained OTDR traces does not require great computational power. Yet an advantage is that a single OTDR device in a CO may be shared by different networks, hence further reducing cost for supervision and monitoring of the PON. The OTDR signals does not need to bypass any network component and also faults inside the splitter or RN may be detected. Further, this solution is scalable, meaning that it may be used in different network topologies. Still an advantage is that the wavelength isolator is transparent to the upstream and downstream data signals.

In an example, the method comprises receiving 440, at the wavelength isolator, backscattered light from the fibre links to the ONUs from the N+1 OTDR signals and forwarding, from the wavelength isolator, the received backscattered light to the splitter towards the OTDR device, the backscattered light constituting N+1 traces when received at the OTDR device.

Each respective transmission of an OTDR signal of a specific wavelength will result in a respective trace. By transmitting N+1 different OTDR signals each having an individual wavelength, N+1 different or individual traces are obtained, one for each specific wavelength of the OTDR signal.

In yet an example, the number of generated OTDR signals should be at least one more than the number of ONUs which are connected to the splitter.

Figure 4B:
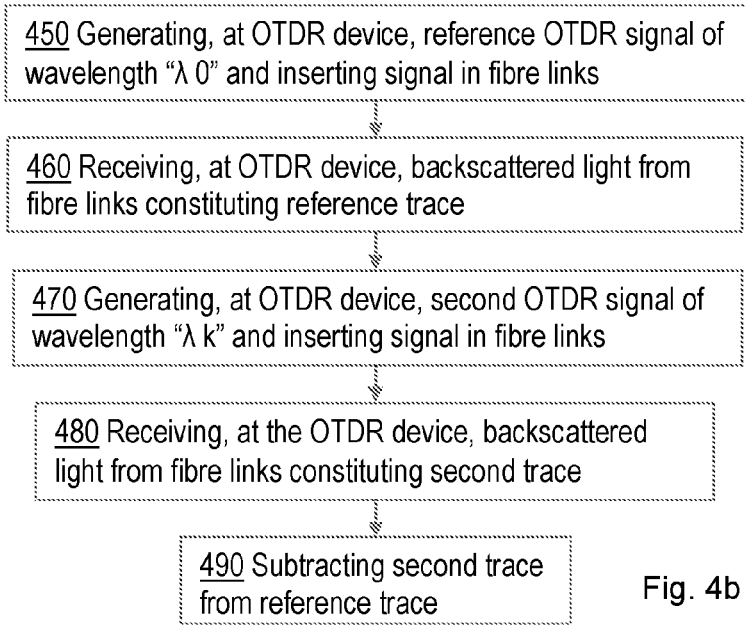

FIG. 4b illustrates yet an example. In this example, output branch k from the splitter is to be supervised. The method comprises generating 450, at the OTDR device, a reference OTDR signal comprising one wavelength, $\lambda_0$, which wavelength is not isolated in the wavelength isolator for any output branch and injecting the reference OTDR signal in fibre links to the splitter towards the ONUs. The method comprises receiving 460, at the OTDR device, backscattered light from the reference OTDR signal constituting a reference trace. The method further comprises generating 470, at the OTDR device, a second OTDR signal comprising wavelength $\lambda_k$ which wavelength is isolated in the wavelength isolator only for output branch k of the wavelength isolator and injecting the second OTDR signal in fibre links to the splitter towards the ONUs. FIG. 4b illustrates the method comprising receiving 480, at the OTDR device, backscattered light from the second OTDR signal constituting a second trace, and subtracting, at the OTDR device, the second trace from the reference trace, thereby obtaining a trace for output branch k from the splitter.

Embodiments herein also relate to a method in a wavelength isolator. Such a method will now be described with reference to FIG. 5, which is a flowchart of an exemplifying embodiment of such a method in a wavelength isolator for isolating one predefined wavelength per individual input of the wavelength isolator. The method has the same objects, advantages and technical features as the wavelength isolator described above. The method will only be described in brief in order to avoid unnecessary repetition.

Figure 5:
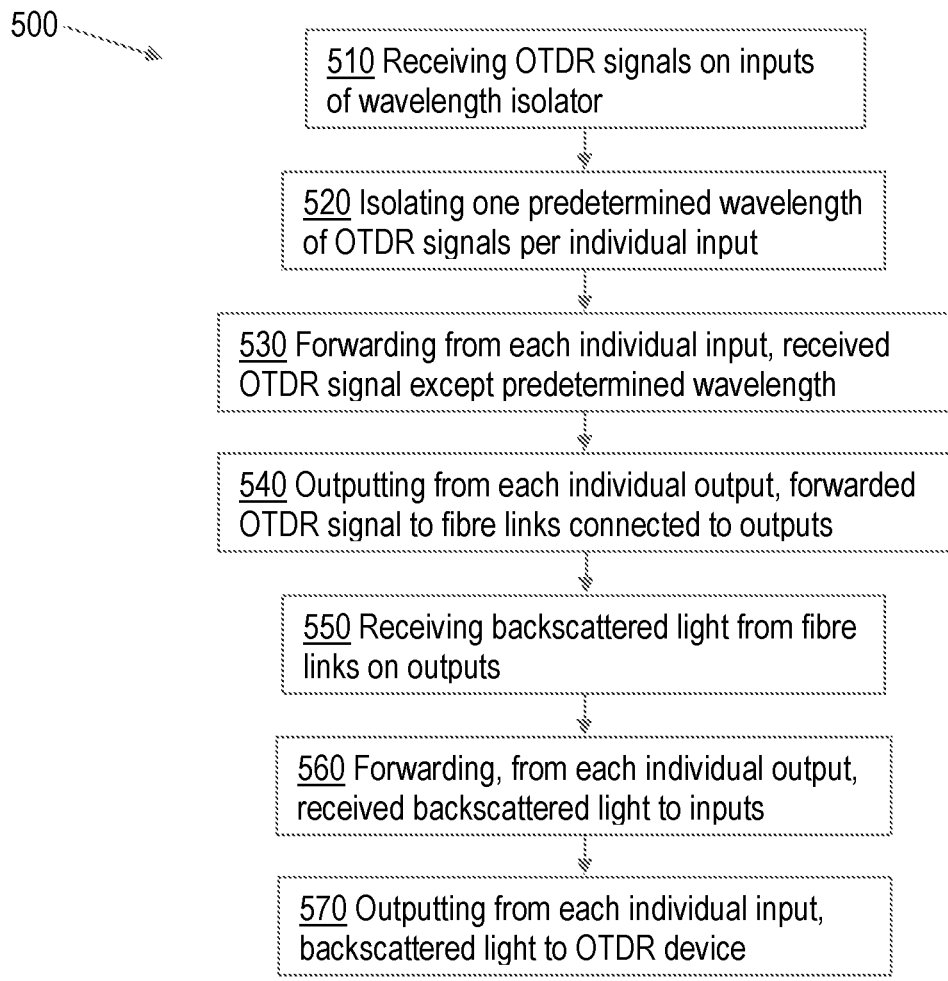
FIG. 5 is a flowchart of an exemplifying embodiment of a method in a wavelength isolator for isolating one predefined wavelength per individual input of the wavelength isolator.

FIG. 5 illustrates a method 500 in a wavelength isolator connectable to output branches of a splitter, for isolating, on individual inputs, one predetermined wavelength of received OTDR signals, from an OTDR device, per individual input, wherein two inputs of the wavelength isolator do not isolate the same wavelength, comprising receiving 510 the OTDR signals on inputs of the wavelength isolator. The method also comprises isolating 520, on each individual input, one predetermined wavelength of the received OTDR signals, which isolated wavelength is specific for one specific input. Further, the method comprises forwarding 530, from each of the inputs of the wavelength isolator, the received OTDR signal of any wavelengths except the respective isolated wavelength for each respective input to associated outputs of the wavelength isolator. FIG. 5 illustrates the method further comprising outputting 540 the forwarded signal from the individual outputs of the wavelength isolator to individual fibre links connected to said individual outputs.

The method in the wavelength isolator has several advantages. In case the splitter and wavelength isolator are comprised in a RN, then no external elements to the RN is needed. A further advantage is that no additional active components are needed. Further, reflectors are relatively inexpensive, thus this supervision or monitoring of the PON is a cost effective solution. When used in a system as described above, all the above advantages can be achieved. Still an advantage is that the wavelength isolator is transparent to the upstream and downstream data signals.

According to an embodiment, each individual input of the wavelength isolator is associated with one individual output of the wavelength isolator.

According to still an embodiment, the method further comprises receiving 550 backscattered light from fibre links at the outputs of the wavelength isolator; and forwarding 560 the backscattered light from the outputs to the inputs of the wavelength isolator. The method also comprises outputting 570 the backscattered light on fibre link towards the OTDR device.

Figure 6A:
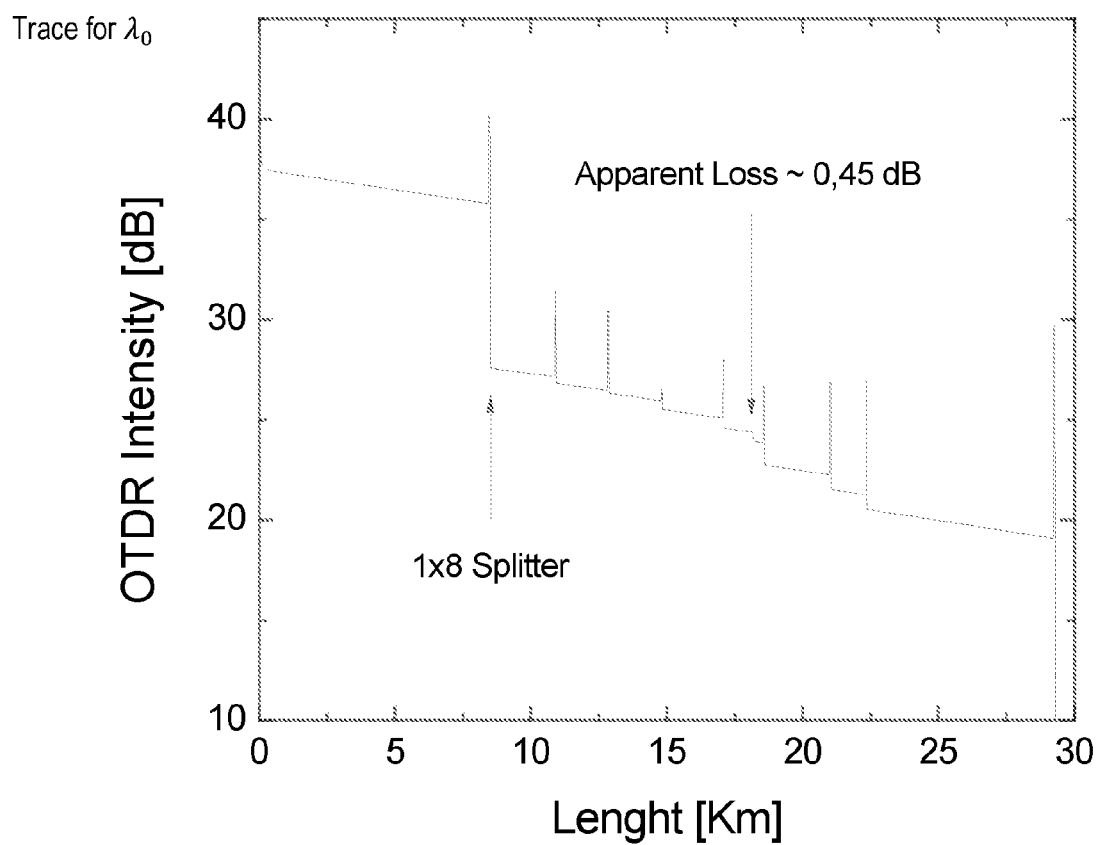
FIGS. 6a-6c illustrate an example of supervising one fibre link between the splitter or wavelength isolator and an ONU in a PON.
Figure 6B:
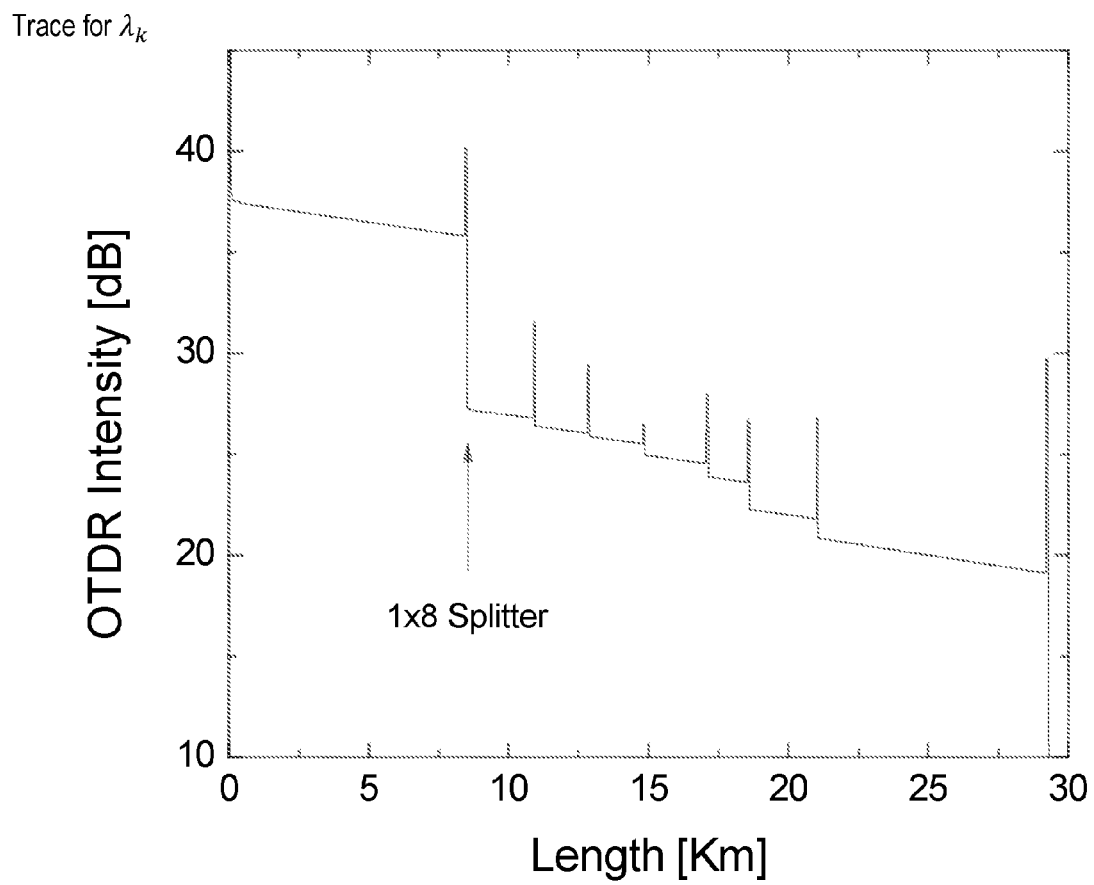

FIGS. 6a-6b illustrate an example of supervising a PON comprising eight ONUs. FIG. 6a illustrates a trace obtained at an OTDR device by transmitting an OTDR signal towards the eight ONUs by transmitting the signal to a splitter. The OTDR signal has a wavelength of $\lambda_0$, which is the wavelength that is not isolated in any wavelength isolator. This means that the OTDR signal will be split in the splitter into eight OTDR sub-signals, the sub-signals will flow through the wavelength isolator and travel in respective fibre links to each of the eight ONU. As the eight OTDR sub-signal travel in the respective eight individual fibre links towards the eight ONUs, parts of the OTDR sub-signals will be backscattered towards the OTDR device from each fibre link. Once the backscattered light from all eight fibre links are received at the OTDR device, a trace is obtained for the OTDR signal having wavelength $\lambda_0$. In this example, the trace reveals an unexpected loss of about 0.45 dB a little before 20 km from the splitter. This means that one of the eight fibre links connecting the splitter and wavelength isolator with the eight respective ONUs is faulty in some manner.

FIG. 6b illustrates a trace obtained at an OTDR device by transmitting an OTDR signal towards the eight ONUs by transmitting the signal to a splitter. The OTDR signal has a wavelength of $\lambda_k$, which is the wavelength that is isolated in the wavelength isolator for splitter output branch k, k=1, 2, 3 . . . or 8. Eight different traces may be obtained by transmitting eight different OTDR signals from the OTDR device, wherein the first OTDR signal has wavelength $\lambda_1$, the second OTDR signal has wavelength $\lambda_2$, the third OTDR signal has wavelength $\lambda_3$ and so on up to the eighth OTDR signal which has wavelength $\lambda_8$. In this example illustrated in FIGS. 6a-6c, fibre link k is the one in which a fault has occurred. Since an OTDR signal having wavelength $\lambda_k$ will be isolated in isolating arrangement k, the OTDR sub-signal having wavelength $\lambda_k$ will not be sent down fibre link k, but in the other seven fibre links not being associated with any fault. An OTDR signal having wavelength $\lambda_k$ will thereby result in a trace not showing any fault, wherein the trace is the sum of the seven sub-signals which were injected in a respective fibre link.

Figure 6C:
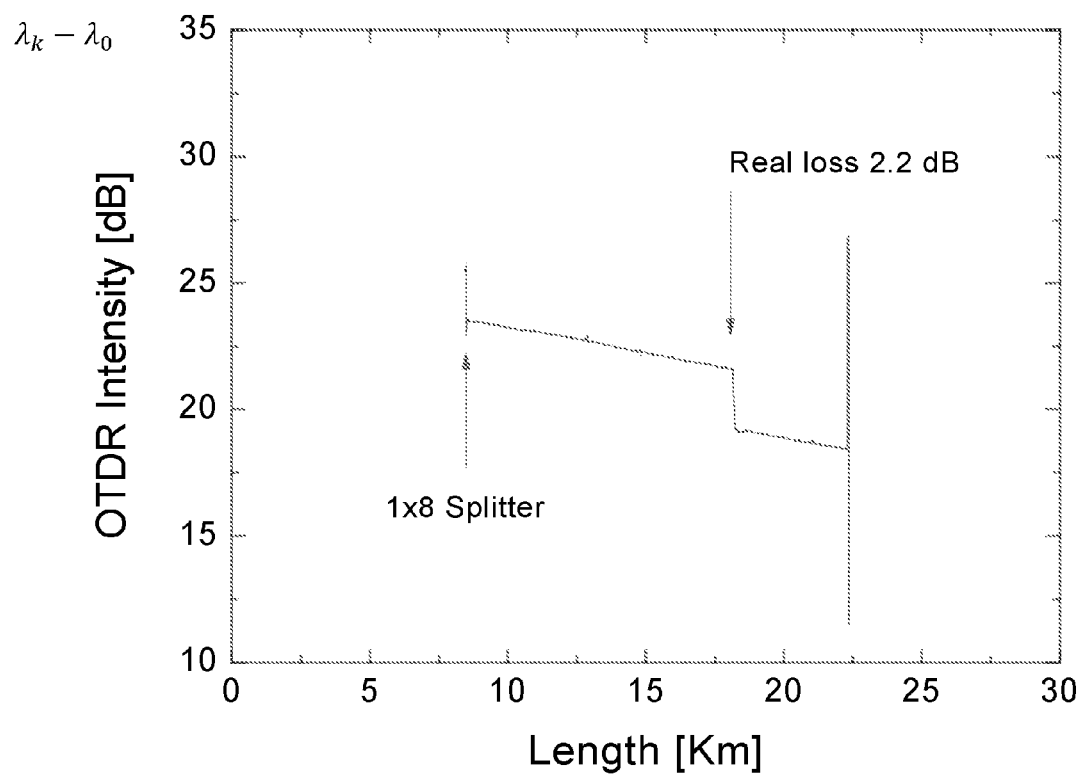

FIG. 6c illustrates a trace obtained by subtracting the trace obtained by the OTDR signal having wavelength $\lambda_0$ from the trace obtained by the OTDR signal having wavelength $\lambda_k$. Assume that k=7, then a trace obtained by OTDR sub-signals having wavelength $\lambda_7$ will be more or less identical to a trace obtained by OTDR sub-signals having wavelength $\lambda_0$ for all fibre links except fibre link k, where k=7. Thereby subtracting the trace obtained by OTDR sub-signals having wavelength $\lambda_7$ from the trace obtained by OTDR sub-signals having wavelength $\lambda_0$ will be zero for all fibre links except fibre link k, where k=7. Subtracting the OTDR trace having wavelength $\lambda_7$ from the OTDR trace having wavelength $\lambda_0$ results in a trace for the OTDR signal having wavelength $\lambda_0$ but only for fibre link 7.

Further, since the trace for fibre link k illustrated in FIG. 6c only comprises the trace for that specific fibre link, the magnitude of the fault is more accurately obtained. In FIG. 6a, the trace is the result from backscattered light from all eight fibre links making the magnitude of the fault much smaller. In FIG. 6a, the trace associated with only the fibre link in which the fault has occurred is obtained, wherein the magnitude of the fault is not diminished due to backscattered light in fibre link which are not of interest. In this manner, the location and the severity of the fault may be determined.

By the system and the wavelength isolator, a trace, or OTDR trace, may be obtained of a specific network branch, e.g. branch k where k=1, 2, . . . , N. A network branch comprises a fibre link 160a, 160b, . . . , 160N in FIG. 1, in this example branch 160k. The trace contains no information on any other branch, or fibre link, except for the specified branch, k, for which the trace is obtained. This is possible due to performing a couple of different traces, one being the trace with the specific wavelength, $\lambda_0$, which is not isolated in the wavelength isolator. The other trace is a trace comprising the wavelength, $\lambda_k$, which is isolated for the specific branch k for which supervision is performed. Then subtracting the second trace from the first trace leaves only the part with $\lambda_0$ with respect to branch 160k. It shall be pointed out that the subtraction by one trace from the other is a linear combination.

The obtained trace by an OTDR signal shows the level of backscattered light, or backscattered signal, at each point along the fibre link 160a-160N, as well as reflection peaks due to connectors, splices and other devices, such as the reflectors installed at the RN that reflect light at a specific wavelength. Therefore, a trace obtained with pulses at wavelength $\lambda_k$ shows the curve relative to the backscattered light between the CO and the RN and the sum of all intensities of all events in all branches, except for branch k, where all light is reflected inside the RN due to the presence of a reflector with high reflectivity at wavelength $\lambda_k$. This happens for all values of k from 1 to N. Thus, we first acquire and store regular OTDR traces corresponding to all wavelengths $\lambda_1$ to $\lambda_N$.

Whenever an OTDR signal of wavelength $\lambda_0$ is launched in the fibre, however, there are no reflectors, or wavelength isolators arrangements, in the wavelength isolator that match this wavelength, and the obtained OTDR trace is the sum of all backscattered light from all N branches of the network. Similarly, a regular OTDR trace using a pulse at wavelength $\lambda_0$ is acquired and stored.

In order to obtain a curve representing the trace of a specific branch k, it suffices to subtract the trace obtained when $\lambda_k$ was launched from the trace obtained with $\lambda_0$. The result of this subtraction is the trace corresponding to branch k alone. In order to monitor or supervise all branches, or fibre links, this procedure is repeated successively for all OTDR signals of different wavelengths from 1 to N, no matter the value of N.

The OTDR device is in one example a tunable OTDR device, which is able to output OTDR signals of different wavelengths. In another example, the OTDR device is a standard OTDR device able to output only one wavelength but with an external wavelength adaptation module in connected with the OTDR device in the central office. The external wavelength adaptation module is an arrangement which is configured to receive a signal having a certain wavelength and modulating the wavelength of the signal so as to output a signal having a wavelength different than the wavelength of the received signal.

It should be noted that FIGS. 1 and 2 merely illustrate various functional units in the system and/or the wavelength isolator in a logical sense. The functions in practice may be implemented using any suitable software and hardware means/circuits etc. Thus, the embodiments are generally not limited to the shown structures of the system and/or the wavelength isolator and the functional units. Hence, the previously described exemplary embodiments may be realised in many ways.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A system for supervision of a Passive Optical Network, PON, comprising:
 an Optical Time Domain Reflectometer, OTDR device, adapted to generate N+1 OTDR signals of wavelengths $\lambda_0, \lambda_1, \ldots, \lambda_N$, respectively, and to inject the OTDR signals in a fibre link towards Optical Network Users, ONUs,
 a splitter having N output branches, wherein an input of the splitter is connected to the output of the OTDR device and the output branches of the splitter are connected to the ONUs, wherein the splitter is arranged to split the received OTDR signals and forward them towards the ONUs, and
 a wavelength isolator having inputs connected to the splitter output branches, the wavelength isolator being configured to isolate, on individual inputs, one predetermined wavelength of the received OTDR signals per individual input, wherein two inputs of the wavelength isolator do not isolate the same wavelength and to forward, from each of the inputs of the wavelength isolator, the received OTDR signals except the respective isolated wavelength to associated outputs of the wavelength isolator towards the ONUs, which are connected to the wavelength isolator by individual fibre links,
 thereby filtering out one predetermined wavelength of the OTDR signal per fibre link,
 wherein each individual input of the wavelength isolator is connected to a second port of a respective first circulator having three ports, wherein a third port of the first circulator is connected to a reflector reflecting one predetermined wavelength specific for each individual input, the reflector further being connected to a first port of a second circulator having three ports, wherein the second port of the second circulator is connected to one individual output of the wavelength isolator associated with a respective individual input, wherein the third port of the second circulator is connected to a first port of the first circulator.

2. The system according to claim 1, wherein the wavelength isolator is adapted to receive backscattered light from along the fibre links and to forward the received backscattered light to the splitter towards the OTDR device.

3. The system according to claim 1, wherein the number of generated OTDR signals of individual wavelengths is at least one more than the number of ONUs which are connected to the splitter by the individual fibre links.

4. A wavelength isolator having inputs connectable to splitter output branches of a splitter, the wavelength isolator being configured to receive OTDR signals on the inputs and to isolate one predetermined wavelength of a received optical signal per individual input, wherein two inputs of the wavelength isolator do not isolate the same wavelength, the wavelength isolator further being adapted to forward, from each of the inputs of the wavelength isolator, a received OTDR signal of any wavelengths except the respective isolated wavelength for each respective input to associated individual outputs of the wavelength isolator and to output from the individual outputs, the forwarded respective OTDR signals,
 wherein each individual input of the wavelength isolator is connected to a second port of a respective first circulator having three ports, wherein a third port of the first circulator is connected to a reflector reflecting one predetermined wavelength specific for each individual input, the reflector further being connected to a first port of a second circulator having three ports, wherein the second port of the second circulator is connected to one individual output of the wavelength isolator associated with a respective individual input, wherein the third port of the second circulator is connected to a first port of the first circulator.

5. The wavelength isolator according to claim 4, wherein when the wavelength isolator is employed in a Passive Optical Network, PON, the inputs of the wavelength isolator are connected to splitter output branches of a splitter and the outputs of the wavelength isolator are connected to fibre links towards Optical Network Users, ONUs.

6. The wavelength isolator according to claim 4, wherein each individual input of the wavelength isolator is associated with one individual output of the wavelength isolator.

7. The wavelength isolator according to claim 4, wherein the reflector is a Bragg reflector.

8. A method in a system for supervision of a Passive Optical Network, PON, comprising:
 generating, in an OTDR device, N+1 OTDR signals of wavelengths $\lambda_0, \lambda_1, \ldots, \lambda_N$, respectively, and injecting the OTDR signals in fibre links to a splitter towards Optical Network Users, ONUs,
 receiving and splitting, in the splitter having N output branches, the OTDR signals, wherein the OTDR signals are received on an input of the splitter and are outputted on output branches to a wavelength isolator towards the ONUs, and
 receiving the OTDR signals in the wavelength isolator and isolating, in the wavelength isolator having inputs connected to the splitter output branches, on individual inputs, one predetermined wavelength of the received OTDR signals per individual input, wherein two inputs of the apparatus do not isolate the same wavelength and forwarding, from each of the inputs of the wavelength isolator, the respective received OTDR signals except the respective isolated wavelength to associated outputs of the wavelength isolator towards the ONUs, which are connected to the wavelength isolator by individual fibre links,
 thereby filtering out one predetermined wavelength of the N+1 OTDR signal per individual fibre link to individual ONUs,
 wherein output branch k from the splitter is to be supervised, the method further comprising:
 generating, at the OTDR device, a reference OTDR signal comprising one wavelength, $\lambda_0$, which wavelength is not isolated in the wavelength isolator for any output branch and injecting the reference OTDR in fibre links to the splitter towards the ONUs, receiving, at the OTDR device, backscattered light from the reference OTDR signal constituting reference trace, generating, at the OTDR device, a second OTDR signal comprising wavelength $\lambda_k$ which wavelength is isolated in the wavelength isolator only for output branch k of the wavelength isolator and injecting the second OTDR signal in fibre links to the splitter towards the ONUs, receiving, at the OTDR device, backscattered light from the second OTDR signal constituting a second trace, and subtracting, at the OTDR device, the second trace from the reference trace, thereby obtaining a trace for output branch k from the splitter.

9. The method according to claim 8, further comprising receiving, at the wavelength isolator, backscattered light from the fibre links to the ONUs from the N+1 OTDR signals and forwarding, from the wavelength isolator, the received backscattered light to the splitter towards the OTDR device, the backscattered light constituting traces when received at the OTDR device.

10. The method according to claim 8, wherein the number of generated OTDR signals is at least one more than the number of ONUs which are connected to the splitter.

11. A method in a wavelength isolator connectable to splitter output branches of a splitter, for isolating, on individual inputs, one predetermined wavelength of received OTDR signals, from an OTDR device, per individual input, wherein two inputs of the wavelength isolator do not isolate the same wavelength, the method comprising:

receiving the OTDR signals on inputs of the wavelength isolator, isolating, on each individual inputs, one predetermined wavelength of the received OTDR signals, which isolated wavelength is specific for one specific input, forwarding, from each of the inputs of the wavelength isolator, the received OTDR signal of any wavelengths except the respective isolated wavelength for each respective input to associated outputs of the wavelength isolator, and outputting the forwarded signal from the individual outputs of the wavelength isolator to individual fibre links connected to said individual outputs, wherein each individual input of the wavelength isolator is connected to a second port of a respective first circulator having three ports, wherein a third port of the first circulator is connected to a reflector reflecting one predetermined wavelength specific for each individual input, the reflector further being connected to a first port of a second circulator having three ports, wherein the second port of the second circulator is connected to one individual output of the wavelength isolator associated with a respective individual input, wherein the third port of the second circulator is connected to a first port of the first circulator.

12. The method according to claim 11, wherein each individual input of the wavelength isolator is associated with one individual output of the wavelength isolator.

13. The method according to claim 11, further comprising:

receiving backscattered light from fibre links at the outputs of the wavelength isolator, forwarding the backscattered light from the outputs to the inputs of the wavelength isolator, and outputting the backscattered light on fibre link towards the OTDR device.

\* \* \* \* \*